(12) United States Patent
Weigert

(10) Patent No.: US 7,228,020 B2
(45) Date of Patent: Jun. 5, 2007

(54) OPTOELECTRONIC ARRANGEMENT HAVING A SURFACE-MOUNTABLE SEMICONDUCTOR MODULE AND A COOLING ELEMENT

(75) Inventor: Martin Weigert, Berhanrdswald (DE)

(73) Assignee: Finisar Corporation, Sunnyvale, CA (US)

( * ) Notice: Subject to any disclaimer, the term of this patent is extended or adjusted under 35 U.S.C. 154(b) by 133 days.

(21) Appl. No.: 11/055,480

(22) Filed: Feb. 9, 2005

(65) Prior Publication Data
US 2006/0045413 A1 Mar. 2, 2006

Related U.S. Application Data

(60) Provisional application No. 60/606,279, filed on Aug. 31, 2004.

(51) Int. Cl.
  G02B 6/10 (2006.01)
  G02B 6/26 (2006.01)
  G02B 6/42 (2006.01)
  G02B 6/12 (2006.01)
  H01L 33/00 (2006.01)
(52) U.S. Cl. .......................... 385/14; 385/88; 385/92; 385/94; 385/131; 385/132; 385/15; 257/80; 257/81; 257/82

(58) Field of Classification Search ................ 385/14, 385/88, 89, 92, 93, 94, 129, 130, 131, 15; 257/80, 81, 82
See application file for complete search history.

(56) References Cited

U.S. PATENT DOCUMENTS

| 4,571,728 | A | * | 2/1986 | Yoshikawa | 372/36 |
| 5,193,083 | A | * | 3/1993 | Yanagawa | 369/116 |
| 6,055,815 | A | * | 5/2000 | Peterson | 62/3.7 |
| 6,196,002 | B1 | * | 3/2001 | Newman et al. | 62/3.7 |
| 2003/0178615 | A1 | * | 9/2003 | Sato | 257/9 |
| 2006/0045413 | A1 | * | 3/2006 | Weigert | 385/15 |

* cited by examiner

Primary Examiner—Brian M. Healy
(74) Attorney, Agent, or Firm—Workman Nydegger

(57) ABSTRACT

An optoelectronic arrangement having a surface-mountable semiconductor module having at least one optoelectronic transmitting and/or receiving unit, a housing, in which the optoelectronic transmitting and/or receiving unit is arranged, and a mounting side of the housing, which, in the case of surface mounting of the semiconductor module on a printed circuit board, faces the printed circuit board. The arrangement furthermore has a cooling element, which is thermally coupled to the semiconductor module for the purpose of cooling the optoelectronic transmitting and/or receiving unit. The cooling element is arranged on a side of the housing that is remote from the mounting side.

19 Claims, 4 Drawing Sheets

OPTOELECTRONIC ARRANGEMENT HAVING A SURFACE-MOUNTABLE SEMICONDUCTOR MODULE AND A COOLING ELEMENT

RELATED APPLICATION

The present application claims priority of U.S. patent application Ser. No. 60/606,279 filed by Martin Weigert on Aug. 31, 2004.

FIELD OF THE INVENTION

The invention relates to an optoelectronic arrangement having a surface-mountable semiconductor module and a cooling element.

BACKGROUND OF THE INVENTION

Surface-mountable semiconductor modules are also called SMD devices ("surface mounted devices") and are usually arranged in a housing made of plastic. The arrangement comprising semiconductor component and housing is mounted by a mounting side of the housing on surfaces such as e.g. a side of a printed circuit board.

Such a semiconductor module may have an optoelectronic transmitting and/or receiving unit via which light signals can be received and/or transmitted. Since the wavelength of the light signals is dependent on the temperature of the transmitting and/or receiving unit, it is known to provide a cooler for temperature stabilization of the transmitting and/or receiving unit. Such a cooler is connected to the semiconductor module and compensates for temperature fluctuations on account of heating of electrical or optoelectronic components of the semiconductor module and also external temperature fluctuations.

Since the transmitting and/or receiving unit is intended to be connected to a further optical element in at least one light radiating direction, the SMD device is intended to be mounted by the mounting side of its housing onto a printed circuit board and, moreover, the cooler is intended to be positioned, there is the problem of how surface-mountable transmitting and/or receiving units can be expediently cooled.

One possible arrangement is disclosed in DE 102 38 843. In this case, a cooling element is arranged between the printed circuit board and the semiconductor module and cools the semiconductor module on the mounting side of the housing. In the case of this sandwich design, the optoelectronic transmitting and/or receiving unit of the surface-mountable semiconductor module is arranged such that its optically active area points in the direction that points away from the cooling element and the printed circuit board. The construction thus comprises, from bottom to top, printed circuit board, cooling element and upwardly oriented transmitting and/or receiving unit.

There is a need for optoelectronic arrangements having a surface-mountable semiconductor module and a cooling element which are formed alternatively to arrangements known heretofore, the intention being in particular to provide an efficient cooling of the transmitting and/or receiving unit.

SUMMARY OF THE INVENTION

In accordance with the present invention, the surface-mountable semiconductor module has at least one optoelectronic transmitting and/or receiving unit and also a housing, in which the optoelectronic transmitting and/or receiving unit is arranged. The housing has a mounting side, which, in the case of surface mounting of the semiconductor module on a printed circuit board, faces the printed circuit board. The semiconductor module is thermally coupled to a cooling element for the purpose of cooling the transmitting and/or receiving unit. The cooling element is arranged on a side of the semiconductor module that is remote from the mounting side.

The cooling element is thus situated in a mounting position in which the semiconductor module is mounted on a printed circuit board. Unlike in the prior art, it is not situated between the semiconductor module and the printed circuit board, but rather is in a thermal contact with that side of the semiconductor module which is opposite to the printed circuit board. By virtue of the fact that the cooling element is arranged on the semiconductor module, which is in turn arranged in the mounting position on the printed circuit board, the cooling effect is concentrated in the direction of the semiconductor module. Unnecessary cooling of the printed circuit board by a cooling element that is constricted between semiconductor module and printed circuit board is avoided.

The optoelectronic transmitting and/or receiving unit is preferably a photodiode, an LED or a semiconductor laser.

In the sense of the invention, the term "surface-mountable semiconductor module" is to be understood such that the semiconductor module is provided for being able to be mounted onto a surface. For this purpose, the semiconductor module has mounting means for mounting and in particular electrical and/or mechanical connection of the semiconductor module to a surface that can be determined. The surface is preferably a printed circuit board. In this case, the mounting means need not be arranged on the mounting side of the housing of the semiconductor module itself.

On the top side, that is to say that side of the semiconductor module which is remote from the mounting area, there is usually more space for a large cooling element than between printed circuit board and semiconductor module, since the semiconductor module is in contact with the printed circuit board via electrical lines and these conductor tracks occupy a space that is dependent on their number and thickness.

In a particularly preferred embodiment, the semiconductor module has a leadframe, on which the transmitting and/or receiving unit is arranged. The semiconductor module thus comprises at least the leadframe and the transmitting and/or receiving unit, but may additionally also have further electrical and/or electro-optical components. The cooling element is arranged on the leadframe in such a way that it can draw thermal energy from the leadframe. Thus, the cooling element cools the transmitting and/or receiving unit via the leadframe and need not bear directly on the transmitting and/or receiving unit. Since a leadframe is usually formed in areal fashion, the cooling element may be arranged with an area on the leadframe such that there is a thermal contact having the largest possible area between them. The leadframe is preferably arranged on an outer side of the housing, so that it is possible to provide intensive thermal coupling between leadframe and cooling element.

In this case, the transmitting and/or receiving unit is preferably arranged on that side of the leadframe which faces the mounting side. The cooling element is situated on that side of the leadframe which is remote from the transmitting and/or receiving unit. In the mounting position, there is situated above the printed circuit board firstly the transmitting and/or receiving unit, above that the leadframe and on that the cooling element.

This arrangement is favorable since the cooling element can thereby be arranged in such a way that the thermal conduction between cooling element and the transmitting and/or receiving unit is effected only through the narrow leadframe. Thermal energy can thereby be drawn from the transmitting and/or receiving unit particularly efficiently by the cooling element. In this case, it is advantageous, in particular, if the leadframe has a high thermal conductivity, thereby reducing a time delay during the cooling of the transmitting and/or receiving unit by the cooling of the leadframe; equally, it is possible by this means to realize a lower thermal resistance between active component (heat source) and cooler rear side (heat sink).

The leadframe advantageously has contact legs as mounting means for mounting the mounting side of the semiconductor module on a printed circuit board. In this case, the contact legs serve both for mechanically fixing the leadframe to the optoelectronic and, if appropriate, electrical components secured thereto and for providing an electrical contact between the printed circuit board and the semiconductor module.

In one embodiment, the transmitting and/or receiving unit has an optically active area from which and/or into which light signals can be coupled out and/or in. This optically active area is oriented such that it faces the mounting side. Light signals are thus coupled in or out in the mounting position from the transmitting and/or receiving unit in the direction toward the printed circuit board (that is to say in the mounting direction of the SMD device). In this case, it is possible either to provide an opening at the printed circuit board, through which opening the light signals penetrate through the printed circuit board, or else the light signals are coupled into or out of an optical channel of the printed circuit board. In the latter case, the printed circuit board has a deflection arrangement such as, for example, a prism or a mirror in order to couple the light signals into or out of the optical channel of the printed circuit board. The embodiment of the prior art known heretofor is thereby modified insofar as the optically active area of the transmitting and/or receiving unit is no longer oriented such that it points away from the printed circuit board, but rather is oriented toward the printed circuit board.

Alternatively, the optically active area of the transmitting and/or receiving unit may also point toward the side such that the light signals are coupled in and/or out essentially parallel to the mounting area.

The cooling element is preferably formed as a Peltier element. The arrangement of the cooling element according to the invention creates enough space for electrical and/or other supply lines of the cooling element. In the event of polarity reversal, the Peltier element may also be used for heating the optoelectronic transmitting and/or receiving unit if its temperature falls below the optimum operating temperature.

The semiconductor module may have further electrical components which are in electrical contact among one another and with the optoelectronic transmitting and/or receiving unit, for example by means of bonding wires. Said electrical components may be any desired IC chips, resistors, capacitors, etc.

In a particularly preferred embodiment, the semiconductor module is potted with a nontransparent potting material in order to protect devices of the semiconductor module, the potting composition forming the housing. The potting of SMD devices with a black potting composition—which is optically nontransparent to the light radiation used by the transmitting and/or receiving unit—in the form of SMD housings is known, in principle. In this case, the potting composition protects the semiconductor module both against contamination and against mechanical damage. In addition, the potting composition increases the stability of the relative position of the individual components with respect to one another. A nontransparent potting composition is used since it has a low coefficient of thermal expansion.

In this embodiment, it is preferably provided that the nontransparent potting material has a cutout at an optical area of the transmitting and/or receiving unit, from which cutout light signals can be coupled into or out of the transmitting and/or receiving unit. Thus, all of the purely electrical components and contact legs and also bonding wires are completely potted by the nontransparent potting composition. The transmitting and/or receiving unit is potted in a fashion that is not black at its optically active area. In this case, the cutout may either be filled with a transparent gas mixture such as air, for example, or else be potted with a potting material that is optically transparent to the wavelength assigned to the transmitting and/or receiving unit. In this case, the cutout above the optically active area runs in the mounting position preferably at least between the optically active area and the printed circuit board.

Plastic housings for SMD devices that are filled with optically nontransparent potting compositions (also referred to as "black-molded") achieve significantly higher temperature ranges than housings potted with a transparent material. Optically transparent potting compositions usually have a significantly higher coefficient of thermal expansion. The above-described potting of the arrangement means that the temperature compatibility that can be achieved is maximized and only one optical input or output is kept transparent for light signals.

BRIEF DESCRIPTION OF THE DRAWINGS

The invention is explained in more detail below on the basis of exemplary embodiments shown in the figures, in which.

DESCRIPTION OF A PREFERRED
EXEMPLARY EMBODIMENT

Figure 1:
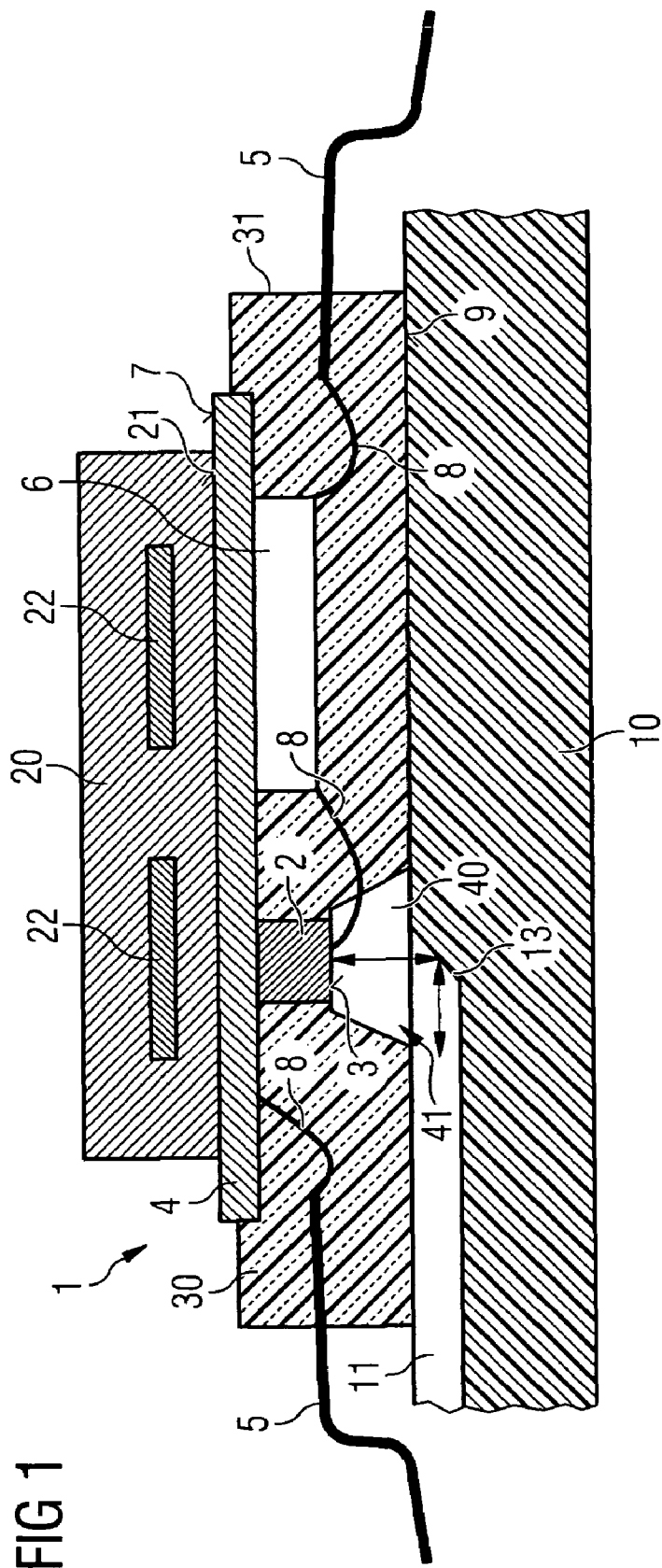
FIG. 1 shows a surface-mountable semiconductor module with a cooler, which is arranged on a printed circuit board, in a diagrammatic sectional illustration.

FIG. 1 shows a diagrammatic section through a surface-mountable semiconductor module 1, which is mounted on a printed circuit board 10 by means of contact legs 5 in such a way that its mounting side 9 points toward the printed circuit board 10.

In this case, the semiconductor module 1 first comprises a leadframe 4 arranged parallel to the printed circuit board 10. The contact legs 5, which arrange the leadframe in its position parallel to the printed circuit board 10, run between the leadframe 4 and the printed circuit board 10 and provide an electrical contact. Furthermore, the semiconductor module 1 comprises an optoelectronic transmitting and/or receiving unit 2. This may be for example a VCSEL, an LED or some other surface-mountable transceiver.

The printed circuit board 10 is composed of customary printed circuit board material or of a patterned plastic film (e.g. of Kapton®).

The optoelectronic transmitting and/or receiving unit (optoelectronic unit) 2 is formed as a prefabricated chip and secured to the leadframe 4 and is arranged between the leadframe 4 and the printed circuit board 10 in such a way that it faces the mounting side 9 of the semiconductor module. For this purpose, the leadframe forms a planar carrier region 4 (also referred to as "die pad") on which the transmitting and/or receiving unit is arranged. The leadframe furthermore has the contact legs (leads) 5. In principle, however, the carrier region may also be composed of a different material than the leads, so that the carrier region is then not part of a leadframe.

Furthermore electrical components, so-called ICs, of which the electrical component 6 is illustrated by way of example, are arranged on the leadframe 4 of the optoelectronic semiconductor module 1. The electrical components 6 are likewise arranged on the leadframe in the interspace between the leadframe 4 and the printed circuit board 10 and are oriented such that they face the mounting side 9 of the semiconductor module 1. Bonding wires 8 run between the electrical components 6 and the transmitting and/or receiving unit 2, said bonding wires serving for contact-connection between the individual components 2, 6 and also for contact-connection to further components such as e.g. other surface-mountable semiconductor modules or for contact-connection to the contact legs 5—the leads.

The electrical and optoelectronic components 2, 6 of the semiconductor module 1 are arranged on that side of the leadframe 4 which faces the printed circuit board 10 and the mounting side 9. On the opposite side of the leadframe 4, the side 7 remote from the printed circuit board 10, a cooling element 20 is thermally coupled by an area 21 to that side 7 of the leadframe 4 which is remote from the printed circuit board 10. Optoelectronic transceivers, such as the transmitting and/or receiving unit 2, are temperature-stabilized in order to be able to set the transmitted or detected wavelength. This involves various cooling instances of heating of the transmitting and/or receiving unit 2 on account of evolution of heat within the electrical components on account of an electrical resistance, and reacting to temperature fluctuations externally. In the case of the semiconductor module 1 of FIG. 1, the cooling element 20 serves for the temperature stabilization of the optoelectronic transmitting and/or receiving unit 2. In this case, the leadframe 4 has a highest possible coefficient of thermal conductance in order that the temperature stabilization of the transmitting and/or receiving unit 2 can be effected as far as possible immediately. In this case, the cooling element 20 draws thermal energy from the transmitting and/or receiving unit 2 via the leadframe 1 and in the process cools the transmitting and/or receiving unit 2 for the purpose of temperature stabilization.

In this case, the cooling element 20 is in thermal contact with other solid or liquid materials only on its side 21; its other sides, apart from the terminals 22 of the cooling element 20, are preferably only in contact with the ambient air. What is thereby achieved is that the thermal coupling between the semiconductor module 1 and the cooling element 20 is particularly strong since the cooling element 20 does not cool any other material in its vicinity.

The optoelectronic transmitting and/or receiving unit 2 has an optically active area 3 on its side remote from the leadframe 4 and the cooling element 20. In this case, the optically active area 3 faces the printed circuit board 10 and the mounting side 9 and is oriented in such a way that it can couple light signals in or out essentially perpendicularly toward the printed circuit board 10 or perpendicularly away from the printed circuit board 10. Light is coupled in or out in the mounting direction in which the semiconductor module 1 is mounted onto the printed circuit board 10 or is provided for mounting. The mounting direction is essentially formed perpendicular to the leadframe 4.

Light signals coupled in or out by the transmitting and/or receiving unit 2 are reflected at a mirror area 13 of the printed circuit board 10 and coupled into or from an optical channel 11 of the printed circuit board. In this case, the optical channel 11 runs parallel to the surface of the printed circuit board 10 in that side of the printed circuit board 10 which is assigned to the surface-mountable semiconductor elements 1. Alternatively, the optical channel 11 may also run on the opposite side of the printed circuit board 10, or, instead of the mirror 13, provision may be made of, for example, a prism, a lens or some other coupling device for reflection or imaging.

The interspace between the semiconductor module 1 and the printed circuit board 4 is potted with an optically nontransparent potting composition 30. In this case, optically nontransparent relates to the wavelength of the light coupled in or out by the transmitting and/or receiving unit 2. In this case, the potting composition 30 is composed of an unfilled plastic and in this case forms a housing 31 for the leadframe 4 and the electrical or optoelectrical components 2 and 6. Such surface-mountable housings are also called SMD housings and are part of SMD devices such as the surface-mountable semiconductor module 1.

The semiconductor module 1 thus comprises the leadframe 4, the optoelectronic transmitting and/or receiving unit 2, the electrical component 6, bonding wires 8, contact legs 5 and the housing 31.

SMD housings are usually molded in "black" fashion since highly filled plastic housings can achieve significantly higher temperature ranges and thereby have a higher temperature compatibility than optically transparent potting compositions.

A cutout 41 is arranged in the potting composition 30 of the housing 31 at the optically active area 3 of the transmitting and/or receiving unit 2. In this case, the cutout 41 completely uncovers the optically active area 3; the remaining parts of the transmitting and/or receiving unit 2 and also the electrical components 6 are still encapsulated by the black potting composition.

In this case, potting with the nontransparent potting composition 30 serves to protect the components 2, 6 and also the leadframe 4 both against mechanical loading such as impacts, and for protection against contamination.

In this case, the cutout 41—formed for example by milling or laser removal—runs continuously in the spatial region between the optically active area 3 and the printed circuit board 10 in the mounting direction of the semiconductor module 1 in order to enable light signals to be coupled into or out of the optically active area 3 from or into the optical channel 11 of the printed circuit board 10. The dimensions of that side of the cutout 41 which is present at the optically active area 3 are matched to the size of the optically active area. The cutout 41 preferably widens with increasing distance from the transmitting and/or receiving unit 2. As a result, the cutout 41 is slightly funnel-shaped, which proves to be favorable for coupling light signals in and out. The cutout 41 may either be filled with a transparent gas or gas mixture such as air or else be potted with an optically transparent potting composition 40. In this case, optically transparent relates to the wavelength range assigned to the transmitting and/or receiving unit 2. By way of example, transparent resin or silicone serve as the transparent potting composition 40. By virtue of the fact that a large part of the housing 31 is molded by means of a black potting composition 30, the plastic housing tolerates comparatively high temperatures.

Figure 2:
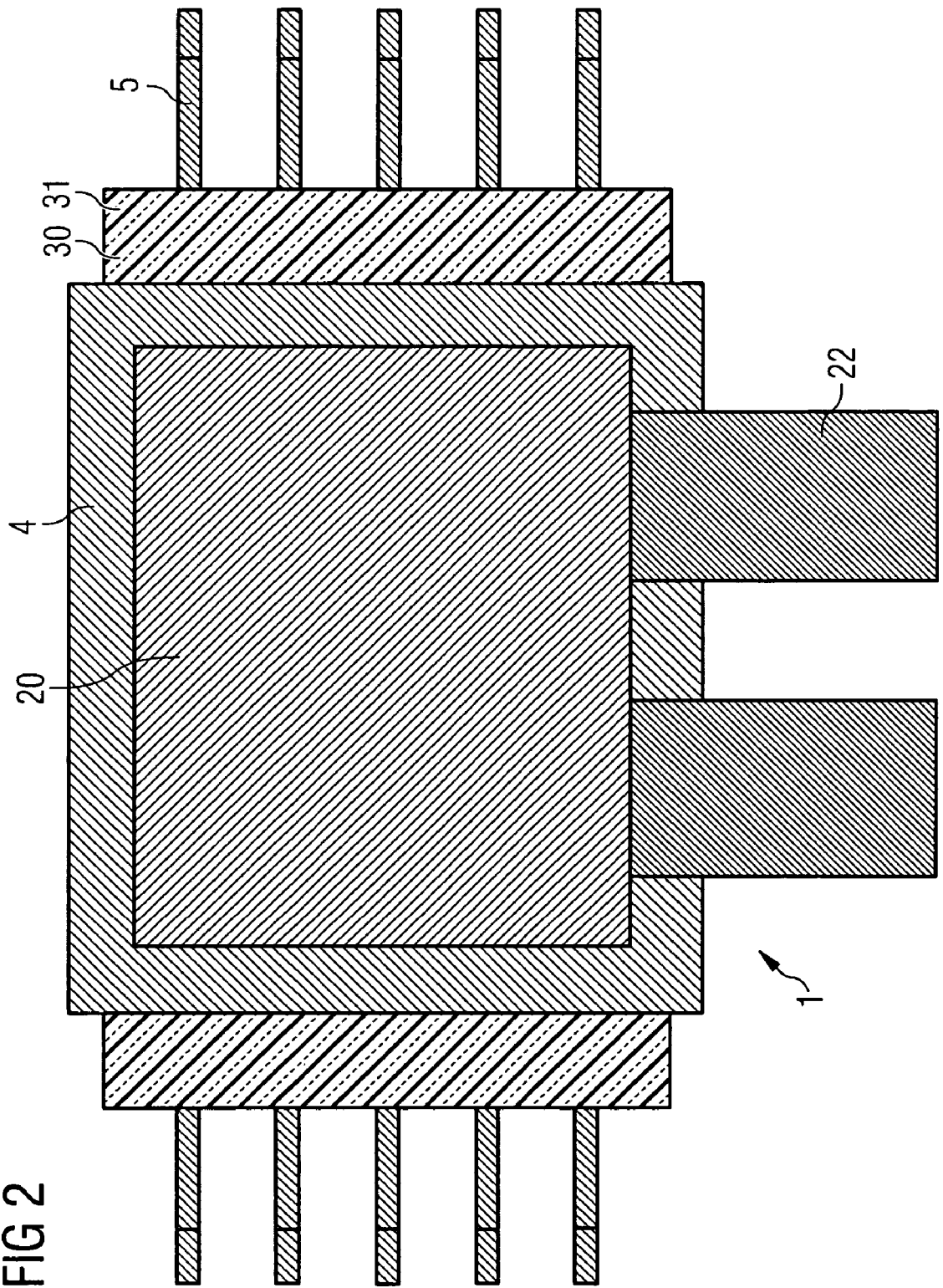
FIG. 2 shows the semiconductor module of FIG. 1 in a diagrammatic plan view.

FIG. 2 shows a diagrammatic plan view of the semiconductor element 1 of FIG. 1. Only the edge of the leadframe 4 of the semiconductor module 1 is discernible, above which the cooling element 20 is arranged. In this case, the dimensions of the cooling element 20 are almost as large as those of the leadframe 4 in order thus to provide the best possible thermal coupling and to be able to draw as much thermal energy as possible from the semiconductor module 1. In this embodiment, the cooling element 20 is a Peltier cooler known per se. At one side of the cooling element 20, electrical terminals 22 lead away from and toward the cooling element 20. The black potting composition 30 of the SMD housing 31 is still discernible under the leadframe 4 of the semiconductor module 1, the electrical and optoelectronic components 2, 6 of the semiconductor module 1 being potted by means of said potting composition. From opposite sides in the SMD housing 31, contact legs 5 lead beyond the housing, via which contact legs the electrical and optoelectronic components 2, 6 (cf. FIG. 1) can be contact-connected to the printed circuit board 10 (not illustrated) arranged below the SMD housing 31. In this case, the contact legs 5 serve both for mechanical contact-connection between semiconductor module 1 and the printed circuit board 10, and for electrical contact-connection.

Figure 3:
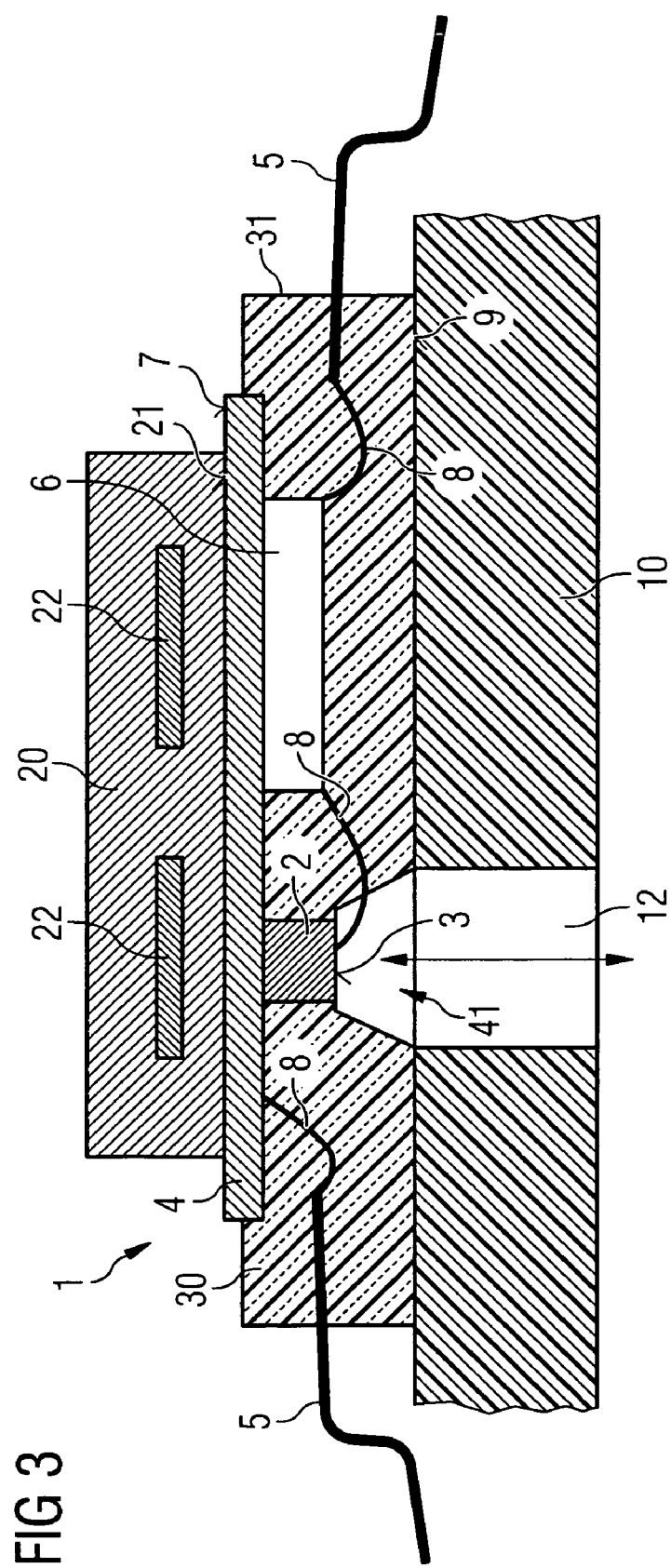
FIG. 3 shows a surface-mountable semiconductor module which couples light signals through an opening of a printed circuit board onto which it is mounted.

In FIG. 3, the semiconductor module 1 from FIG. 1 is arranged on a printed circuit board 10 having no optical channel. At that side of the cutout 41 at the printed circuit board 10 which is opposite to the optically active area 3, an opening 12 is integrated into the printed circuit board 10. Light signals can be coupled through the opening 12 and thus through the printed circuit board 10 into or out of the optically active area 3 of the transmitting and/or receiving unit 2. In this case, the opening 12, like the cutout 41, may be filled with a transparent gas or gas mixture. Alternatively, it is possible to pot either only the cutout 41 with a transparent potting composition or both the cutout 41 and the opening 12 with a transparent resin or silicone. The rest of the reference symbols of FIG. 3 correspond to those of FIG. 1.

Figure 4:
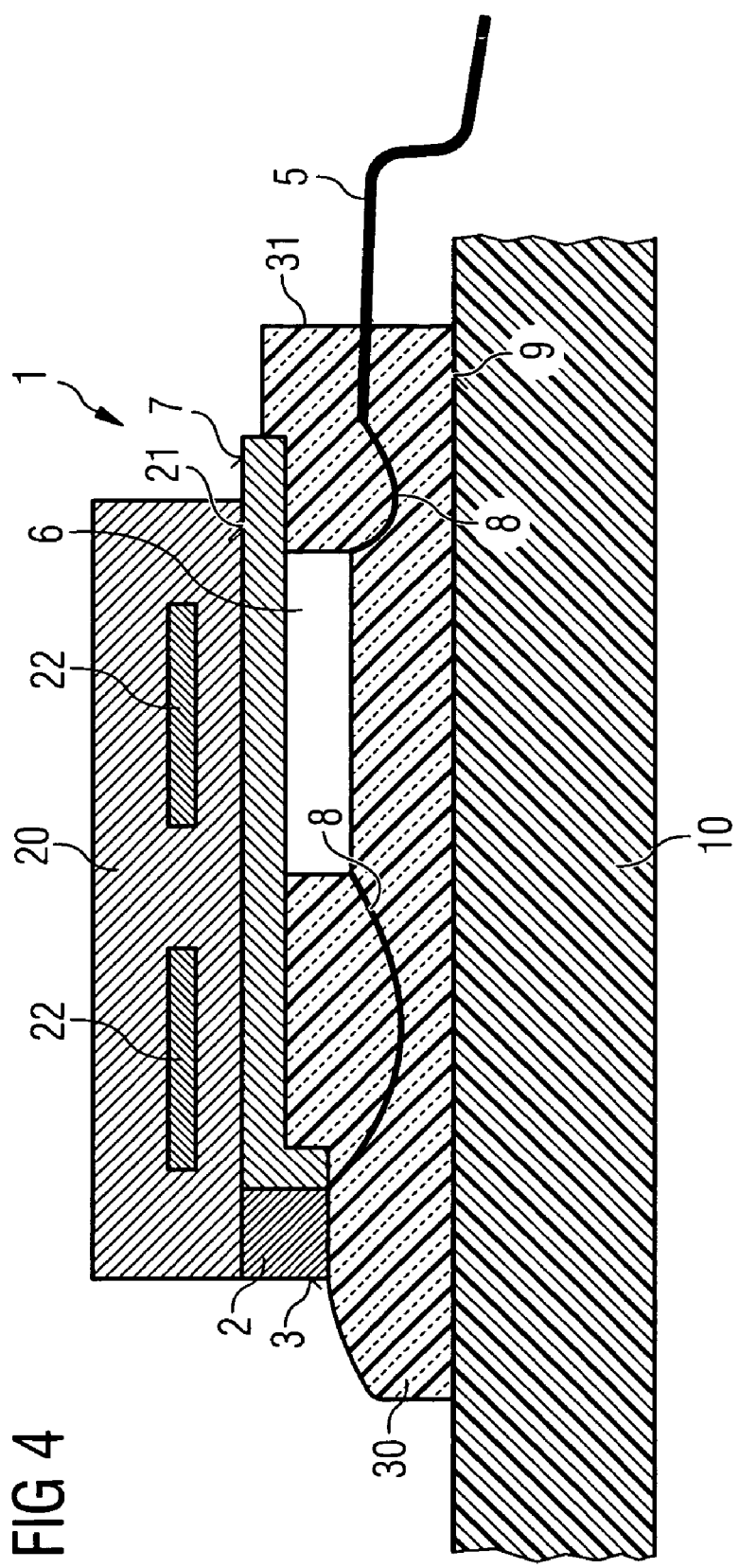
FIG. 4 shows a surface-mountable semiconductor module which is arranged on a printed circuit board and couples light signals in and out parallel thereto.

A further exemplary embodiment of a semiconductor module 1 according to the invention is illustrated in FIG. 4. In contrast to the exemplary embodiments of FIGS. 1 and 3, the leadframe 4 is formed in L-shaped fashion in FIG. 4, so that, at one of its ends, a transmitting and/or receiving element 2 is mounted on the leadframe 4 in such a way that its optically active area 3 points in a direction that runs parallel both to the printed circuit board 10 and to the cooling element 20. What the embodiment of FIG. 4 has in common with the other exemplary embodiments is that the cooling element 20 is arranged on that side 7 of the leadframe 4 which is remote from the printed circuit board 10. The transmitting and/or receiving unit 2 is cooled via the leadframe 4. In addition, the cooling element 20 may also be directly in thermal contact with the transmitting and/or receiving unit 2. The potting composition 30 forming the SMD housing 31 is arranged in a manner that fills the interspace in the spatial region between the leadframe 4 and the printed circuit board 10. The optically active area 3 is free of any black potting composition 30, but may be covered or potted with an optically transparent potting composition depending on the design.

LIST OF REFERENCE SYMBOLS

| | |
|---|---|
| 1 | Semiconductor module |
| 2 | Optoelectronic transmitting and/or receiving unit |
| 3 | Optically active area |
| 4 | Leadframe |
| 5 | Contact legs |
| 6 | Electrical components |
| 7 | Side of the semiconductor module that is remote from the printed circuit board |
| 8 | Bonding wires |
| 9 | Mounting side |
| 10 | Printed circuit board |
| 11 | Optical channel of the printed circuit board |
| 12 | Opening |
| 13 | Mirror area |
| 20 | Cooling element |
| 21 | Area of the cooling element |
| 22 | Terminals of the cooling element |
| 30 | Nontransparent potting material |
| 31 | Housing |
| 40 | Transparent potting material |
| 41 | Cutout |

I claim:

1. An optoelectronic arrangement comprising:
 a surface-mountable semiconductor module comprising:
  at least one optoelectronic transmitting and/or receiving unit, wherein the at least one transmitting and/or receiving unit is arranged on a first side of a leadframe of the semiconductor module;
  a housing, in which the optoelectronic transmitting and/or receiving unit is arranged, the housing having a mounting side, which, in the case of surface mounting of the semiconductor module on a printed circuit board, faces the printed circuit board; and
  a cooling element, which is thermally coupled to a second side of the leadframe such that heat is transferred through the leadframe for the purpose of cooling the optoelectronic transmitting and/or receiving unit,
  wherein the cooling element is arranged on a side of the leadframe that is remote from the mounting side.

2. The arrangement as claimed in claim 1 wherein the leadframe forms an outer side of the housing and the cooling element is thermally coupled to the leadframe.

3. The arrangement as claimed in claim 1, wherein the transmitting and/or receiving unit is arranged on the leadframe on that side thereof which faces the mounting side.

4. The arrangement as claimed in claim 2, wherein the leadframe has a high thermal conductivity, and wherein the cooling element draws thermal energy from the transmitting and/or receiving unit via the leadframe.

5. The arrangement as claimed in claim 1, wherein the transmitting and/or receiving unit has an optically active area for coupling light signals in and/or out, the optically active area facing the mounting side.

6. The arrangement as claimed in claim 1, wherein the transmitting and/or receiving unit has an optically active area for coupling light signals in and/or out, the optically active area pointing toward the side such that the light signals are coupled in and/or out essentially parallel to the mounting area.

7. The arrangement as claimed in claim 1, wherein the cooling element is thermally coupled to the semiconductor module via an area of the cooling element.

8. The arrangement as claimed in claim 1, wherein the cooling element comprises a Peltier element.

9. The arrangement as claimed in claim 1, wherein the semiconductor module further comprises at least one electrical component.

10. The arrangement as claimed in claim 9, wherein the electrical components are heatable or coolable by the cooling element together with the transmitting and/or receiving unit.

11. The arrangement as claimed in claim 1, wherein the semiconductor module is potted with a nontransparent potting material which forms the housing.

12. The arrangement as claimed in claim 11, wherein a portion of the nontransparent potting material that adjoins an optically active area of the transmitting and/or receiving unit defines a cutout for coupling light signals into and/or out of the transmitting and/or receiving unit.

13. The arrangement as claimed in claim 12, wherein the cutout is potted with a transparent potting material.

14. The arrangement as claimed in claim 12, wherein the cutout extends between the optically active area and the mounting side.

15. The optoelectronic arrangement as claimed in claim 1, wherein the arrangement further comprises:
 a printed circuit board, on which the surface-mountable semiconductor module is mounted such that the mounting area of the housing faces the printed circuit board.

16. The arrangement as claimed in claim 15, wherein the printed circuit board includes an optical channel arranged such that light signals can be coupled into and/or out of the optical channel from and/or into the transmitting and/or receiving unit.

17. The arrangement as claimed in claim 15, wherein the printed circuit board defines an opening positioned such that light signals can be transmitted and/or received from and/or into the transmitting and/or receiving unit through the printed circuit board through the opening of the printed circuit board.

18. A surface-mountable semiconductor module comprising:
 a housing having a mounting side configured to mount to the surface of a printed circuit board, an opposing second side, and side edges extending between the mounting and second sides;
 at least one optoelectronic unit mounted in the housing such that the optoelectronic unit is operably exposed through at least one of the mounting side and the side edges; and
 a cooling element mounted on the second side of the housing and thermally coupled to optoelectronic unit, wherein the at least one optoelectronic unit is mounted in the housing at least partially between the mounting side and the cooling element.

19. An optoelectronic arrangement, comprising:
 a printed circuit board including:
  an optical channel for transmission of an optical signal; and
  a mirror area; and
 an optoelectronic unit including:
  a housing having a first side facing the printed circuit board and a second side facing away from the printed circuit board;
  at least one optoelectronic unit mounted in the housing and facing the printed circuit board, wherein the at least one optoelectronic unit is aligned with the mirror area such that an optical signal generated by the at least one optoelectronic unit are redirected along the optical channel; and
  a cooling element mounted on the second side of the housing and thermally coupled to optoelectronic unit.

* * * * *